United States Patent [19]

Negoro

[11] Patent Number: 4,733,278

[45] Date of Patent: Mar. 22, 1988

[54] APPARATUS FOR FORMING IMAGE ON COPYING MACHINE AT VARIABLE ZOOM RATIO

[75] Inventor: Ikuo Negoro, Tokyo, Japan

[73] Assignee: Asahi Kogaku Kogyo Kabushiki Kaisha, Tokyo, Japan

[21] Appl. No.: 945,976

[22] Filed: Dec. 24, 1986

[30] Foreign Application Priority Data

Dec. 25, 1985 [JP] Japan ................................ 60-296166

[51] Int. Cl.4 ................................ G03B 27/36

[52] U.S. Cl. ................................ 355/58

[58] Field of Search ........................ 355/55, 56, 58, 59; 350/429

[56] References Cited

U.S. PATENT DOCUMENTS 1,103,343 7/1914 Becker .............................. 355/56 X 3,765,760 10/1973 Mochimaru .......................... 355/58

*Primary Examiner*—L. T. Hix

*Assistant Examiner*—Brian W. Brown

*Attorney, Agent, or Firm*—Sughrue, Mion, Zinn, Macpeak and Seas

[57] ABSTRACT

A three-group lens barrel for zooming in a photo-copier in which the barrel is movable and fixes a middle lens group. The front and rear lens group are slidable in the barrel. The front and rear lens groups are connected to ends of two link levers. The link levers are swung together or apart by a common pin connection to a swing lever which has at one end a cam follower following a cam groove in the photo-copier. The common pin may be eccentric to finely adjust the lens separation.

6 Claims, 7 Drawing Figures

APPARATUS FOR FORMING IMAGE ON COPYING MACHINE AT VARIABLE ZOOM RATIO

BACKGROUND OF THE INVENTION

1. Field of the Invention

The present invention relates to an apparatus for forming an image on a copying machine at a variable zoom ratio with the aid of a zoom lens system.

2. Background of the Invention

A conventional apparatus of the type contemplated by the present invention that forms an image on a copying machine at variable zoom ratio is described in Unexamined Published Japanese Patent Application NO. 10214/1985. In order to enable displacement of the positions of the first and second lens groups, the apparatus employs a distance altering mechanism that is composed of pins engaging each lens group and a cam barrel having cam grooves into which the pins are fitted. The apparatus is so constructed that when the two lens groups are displaced en masse along the optical axis, the cam barrel is rotatably driven so as to alter the distance between the two lens groups. However, in order for the cam barrel to be rotated in synchronism with the movement of the lens groups, the apparatus requires a large number of components including a rack and pinion assembly, a motor and a worm gear. In addition, this apparatus does not allow for lens change.

SUMMARY OF THE INVENTION

An object, therefore, of the present invention is to provide an apparatus for forming images on a copying machine at a variable zoom ratio that is simple in structure and permits selected lens groups to be changed as required.

In order to attain the aforementioned object, the apparatus of the present invention provides a lens barrel that is disposed to be displaceable in the direction of the optical axis and which has a pair of frames supporting first and third lens groups slidably mounted in the direction of the optical axis. The frame supporting the first lens group is mounted in front of a centrally fixed second lens group and the frame supporting the third lens group is mounted behind the second lens group. The apparatus also includes a pair of link levers that are coupled to said pair of frames and which are opened or closed by means of a lever that swings in response to the displacement of the lens barrel in the direction of the optical axis.

DETAILED DESCRIPTION OF THE PREFERRED EMBODIMENT

Figure 1:
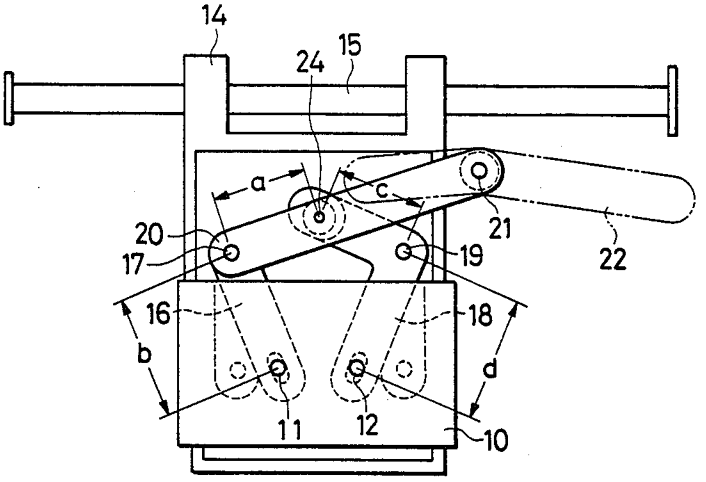
FIG. 1 is a plan view showing an embodiment of the present invention.
Figure 2:
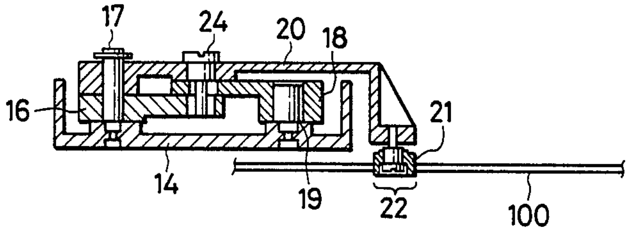
FIG. 2 shows in cross section the essential parts of FIG. 1.
Figure 3:
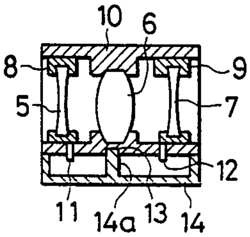
FIG. 3 is a cross section of a lens barrel included in the apparatus of the present invention.
Figure 4:
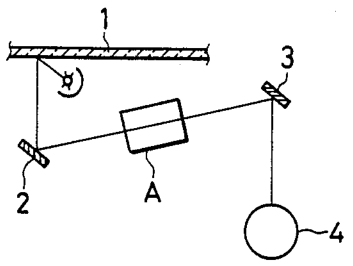
FIG. 4 is a diagrammatic representation of the essential components of a copying machine.

The apparatus of the present invention is depicted in FIGS. 1 to 3. This apparatus is disposed in a copying mechanism as shown by the reference symbol A in FIG. 4 which is a diagrammatic representation of the mechanism. An original placed on a platen 1 is illuminated with light which is guided through mirrors 2 and 3 to be directed onto the surface of a photoreceptor drum 4. The apparatus A is disposed between the two mirrors 2 and 3. As shown in FIG. 3, the apparatus includes three lens groups 5, 6 and 7. The second lens group 6 is fixed in the center of a lens barrel 10, whereas the first lens group 5 is supported by a frame 8 which is positioned closer to the original and the third lens group 7 is supported by a frame 9 which is closer to the photoreceptor 4.

The frames 8 and 9 are mounted in the lens barrel 10 in such a manner that they are displaceable in the direction of the optical axis. Pins 11 and 12 are disposed in such a way that they project downwardly from the frame 8 and 9 respectively through the barrel 10 and are also slidable along the barrel 10.

Below the lens barrel 10 is disposed a movable table 14 whose position is determined by a projection 14a inserted into a positioning hole 13 in the barrel 10. The table 14 is secured to the barrel 10 with a fastening means (not shown). The table 14 is slidably supported by a guide shaft 15, shown in FIG. 1, which extends in the direction of the optical axis of each lens group.

A pair of L-shaped link levers 16 and 18 are swingably supported on pivot pins 17 and 19, respectively, attached to the table 14 and which are provided at their bent positions. One end of the left link lever 16 is pivotally mounted on the pin 11, connected to the frame 8 of the first lens group 5 and one end of the right link lever 18 is pivotally mounted on the pin 12 connected to the frame 9 of the third lens group 7. The two link levers 16 and 18 are coaxilly supported at the other end by an eccentric pin 24. A cam lever 20 having a cam follower 21 attached to one end thereof is pivotally mounted at the other end on the pin 17. The cam follower 21 is fitted in a cam groove 22 formed in the surface of base 100 of the body of the copying machine.

The cam lever 20 is pivotally mounted at its center on the eccentric pin 24. When the table 14 is displaced along the guide shaft 15 by means of a drive mechanism (not shown), the cam follower 21 slides along the cam groove 22, causing the cam lever 20 swing to about the pin 17. In response to this swinging action, the eccentric pin 24 moves either upward or downward (see FIG. 1) so as to open or close the link levers 16 and 18 as a result of their swinging about the pins 17 and 19, respectively. As the levers 16 and 18 are swung to be opened or closed, the frame 8 and 9 will be displaced within the lens barrel 10 in the direction of the optical axis in such a manner that they come closer to each other or depart from each other.

By turning the eccentric pin 24 in the cam lever 20, the relative positions of the cam lever 20 and the link levers 16 and 18 can be altered, to thereby permit fine adjustment of the distance between adjacent lens groups.

Figure 5A:
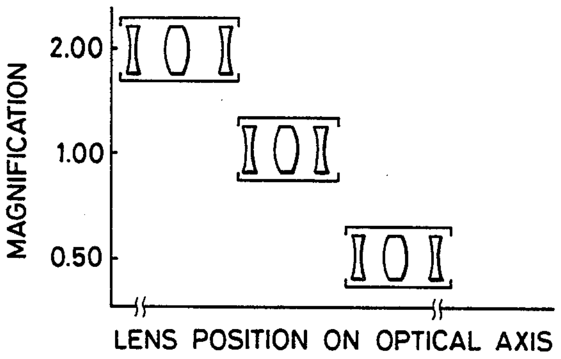
FIG. 5A is a diagram illustrating the relationship between the lens position and magnification.
Figure 5B:
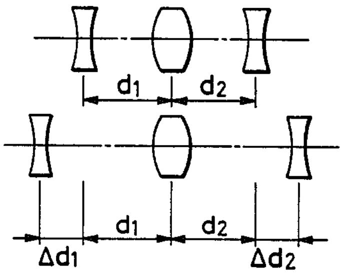
FIG. 5B shows the distances between the lenses of FIG. 5A.

Suppose here that the distance between the pin 17 and eccentric pin 24 is expressed as a, the distance between pins 17 and 11 as b, the distance between eccentric pin 24 and pin 19 as c, the distance between pins 19 and 12 as d, the distance between the first and second lens groups 5 and 6 at a magnification of unity as $d_1$, and the distance between the second and third lens groups 6 and 7 at a magnification of unity as $d_2$ (see FIGS. 5A and 5B). If $b=d$ and $0.8<c/a\leqq 1$, the first and third lens groups 5 and 7 will be displaced in such a manner that the relation $0.8<\Delta d_1/\Delta d_2\leqq 1$ is satisfied, where $\Delta d_1$ and $\Delta d_2$ represent the amounts of displacement from $d_1$ and $d_2$, respectively, during zooming. This also holds true in the case where $a=c$ and $0.8<b/d\leqq 1$.

Figure 6:
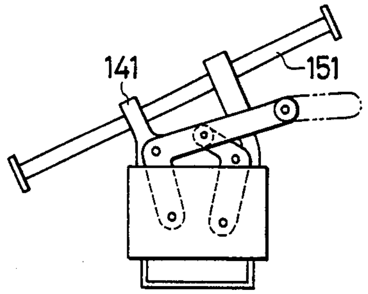
FIG. 6 is a plan view showing another embodiment of the present invention.

FIG. 6 shows another embodiment of the present invention wherein a movable table 141 with a bent end is disposed to be displaceable along an inclined guide shaft 151. The embodiment shown in FIG. 1 assumes the case where the base for original placement is positioned in the center of the platen, whereas the embodiment of FIG. 6 assumes the case where the base is positioned at one end of the platen.

As described in the foregoing, the apparatus of the present invention for forming an image on a copying machine at variable zoom ratio features a very simple construction since it allows the distance between adjacent lens groups to be altered by means of a link mechanism that is operated in response to the movement of the lens barrel. In addition, the apparatus employs separate frames for supporting the first and third lens groups so that it permits these lens groups to be changed as required.

What is claimed is:

1. An apparatus for forming an image at a variable zoom ratio, comprising:

a lens barrel displaceable along an optical axis;

a first lens group;

a second lens group mounted behind said first lens group along said optical axis and fixed to said barrel;

a third lens group mounted behind said second lens group along said optical axis;

a first frame slidable along said optical axis in said barrel and supporting said first lens group a second frame slidable along said optical axis in said barrel and supporting said third lens group;

a swing lever;

means for swinging said swing lever in response to a displacement of said lens barrel along said optical axis;

a pair of link levers coupled to said swing lever and said first and second frames; and a rotatable eccentric pin carried by said swing lever and coaxially supporting both of said link levers at first ends thereof, whereby an amount of said separation of said first and second frames is adjustable by a rotation of said eccentric pin, whereby a separation of said first and second frames is changed in response to said displacement of said lens barrel along said optical axis.

2. An apparatus as recited in claim 1, wherein second ends of said link levers are connected to respective ones of said first and second frames.

3. An apparatus as recited in claim 2, wherein mid portions of said link levers are pivotably fixed relative to said lens barrel.

4. An apparatus as recited in claim 3, further comprising a pin rotatably connecting said swing lever, said mid portion of one of said link levers and said lens barrel.

5. An apparatus as recited in claim 4, further comprising:

a base relative to which said lens barrel is displaceable and having a cam groove formed therein; and a cam follower attached to said swing lever and slidably engaging said cam groove during said displacement of said lens barrel.

6. An apparatus as recited in claim 1 further comprising:

a fixed base having a cam groove;

a table to which said lens barrel is attached and movable along said optical axis relative to said base;

a cam follower attached to one end of said swing lever and slidably engaging said cam groove during movement of said table, wherein another end of said swing lever is pivotably mounted on said table.

* * * * *